United States Patent [19]
Moeller

[11] Patent Number: 5,964,167
[45] Date of Patent: Oct. 12, 1999

[54] VARIABLE WIDTH FIELD IMPLEMENT

[76] Inventor: Brian Moeller, 3126 Valley Ave., Lohrville, Iowa 51453

[21] Appl. No.: 09/188,616

[22] Filed: Nov. 9, 1998

[51] Int. Cl.⁶ .................................................. A01B 73/06
[52] U.S. Cl. ............................................ 111/54; 172/648
[58] Field of Search .................................... 172/648, 630, 172/569; 111/57, 54

[56] References Cited

U.S. PATENT DOCUMENTS

| | | | |
|---|---|---|---|
| 255,934 | 4/1882 | Burger et al. | 172/630 X |
| 479,476 | 7/1892 | Teschner et al. | 172/630 X |
| 490,336 | 1/1893 | Bullard | 172/630 X |
| 1,042,493 | 10/1912 | Smith | 172/630 X |
| 1,397,333 | 11/1921 | Schmitt . | |
| 1,600,135 | 9/1926 | Phillips | 172/648 |
| 1,754,497 | 4/1930 | Boucher | 172/630 X |
| 2,114,049 | 4/1938 | Espe . | |
| 2,226,586 | 12/1940 | Seaholm . | |
| 2,654,198 | 10/1953 | Ryan . | |
| 2,938,588 | 5/1960 | Stein . | |
| 3,643,743 | 2/1972 | Fueslein . | |
| 3,918,528 | 11/1975 | Kinzenbaw | 172/569 X |
| 5,135,056 | 8/1992 | Sartor | 172/569 X |
| 5,462,123 | 10/1995 | Harlan et al. . | |
| 5,477,931 | 12/1995 | Grant . | |

Primary Examiner—Christopher J. Novosad
Attorney, Agent, or Firm—Zarley, McKee, Thomte, Voorhees & Sease

[57] ABSTRACT

A variable width field implement includes a central frame and wing assemblies which are pivotally attached to the central frame. Implement elements are pivotally attached to the wing assemblies. The field implement utilizes a collapsible parallelogram geometry and pivotal connections to allow the width between implement elements to be altered while at the same time the elements retain an orientation that is parallel to the direction of travel.

15 Claims, 4 Drawing Sheets

VARIABLE WIDTH FIELD IMPLEMENT

BACKGROUND OF THE INVENTION

The present invention relates to a variable width field implement to be used in an agricultural field.

Prior art devices have shown field implements wherein the implement elements are attached to a bar and the bar can be rotated relative to the direction of travel. However, in these prior art devices, the element axis would rotate with the bar, causing the axis of the implement element to be at an angle that was not parallel to the direction of travel of the implement. Also, the path distance between implement elements could be adjusted manually, but it could not be altered by a simple rotation of a wing assembly.

It is a primary objective of this invention to provide an improved variable width field implement.

It is a further objective of this invention to provide a variable width field implement having a path distance between the implement elements which is adjustable through the pivotal movement of a wing assembly.

It is a further objective of this invention that the element axis of the implement elements retain an orientation that is parallel to the direction of travel of the implement throughout the swinging movement of the wing assembly.

A further object of the present invention is the provision of a variable width field implement that is economical to manufacture, durable in use, and efficient in operation.

SUMMARY OF THE INVENTION

A variable width field implement comprises an elongated frame that has a forward and rear end. The longitudinal axis of the frame is oriented parallel to the travel direction of the implement. A wing assembly, having both an inner and outer end, is pivotally connected to the frame at the assembly's inner end.

Implement elements are mounted along the length of the wing assembly in a spaced relationship. The element axis of each implement is oriented in the direction of travel.

The wing assembly can be rotated about its pivotal connection to the frame. When the wing assembly is rotated, the outer end of the assembly moves from its initial position to a new position. The path distance between the implement elements in the new position is less than the path distance in the original position.

The implement elements are pivotally connected to the wing assembly through a linkage mechanism. The linkage mechanism holds the implement elements in a position where the elements' axes are always parallel to the direction of travel throughout the pivotal movement of the wing assembly.

The variable width field implement can have more than one wing assembly. A second wing assembly can be pivotally attached to the central frame. The second wing assembly extends away from the frame in a direction opposite that of the first assembly. In a like manner, a plurality of wing assemblies can be pivotally attached to the central frame, with each set of assemblies extending in opposite directions from the frame. All of the additional assemblies have implement elements attached in the same way as they are attached to the first wing assembly.

When a plurality of wing assemblies are used, a longitudinal link can be pivotally connected to each set of assemblies. The link allows each set of assemblies to be rotated in a coordinated manner.

A power means can also be attached to the wing assemblies. The power means is utilized to move the assemblies from an initial position to a new position. The power means could be a hydraulic cylinder, an electric motor, manual power, or any other equivalent source.

The present invention may be used for a variety of implement elements such as ground engaging cultivators, planters, or other implement elements. A lock can also be utilized with the wing assemblies. When engaged, the lock prevents the wing assemblies from pivoting about the frame.

DETAILED DESCRIPTION OF THE PREFERRED EMBODIMENT

Figure 1:
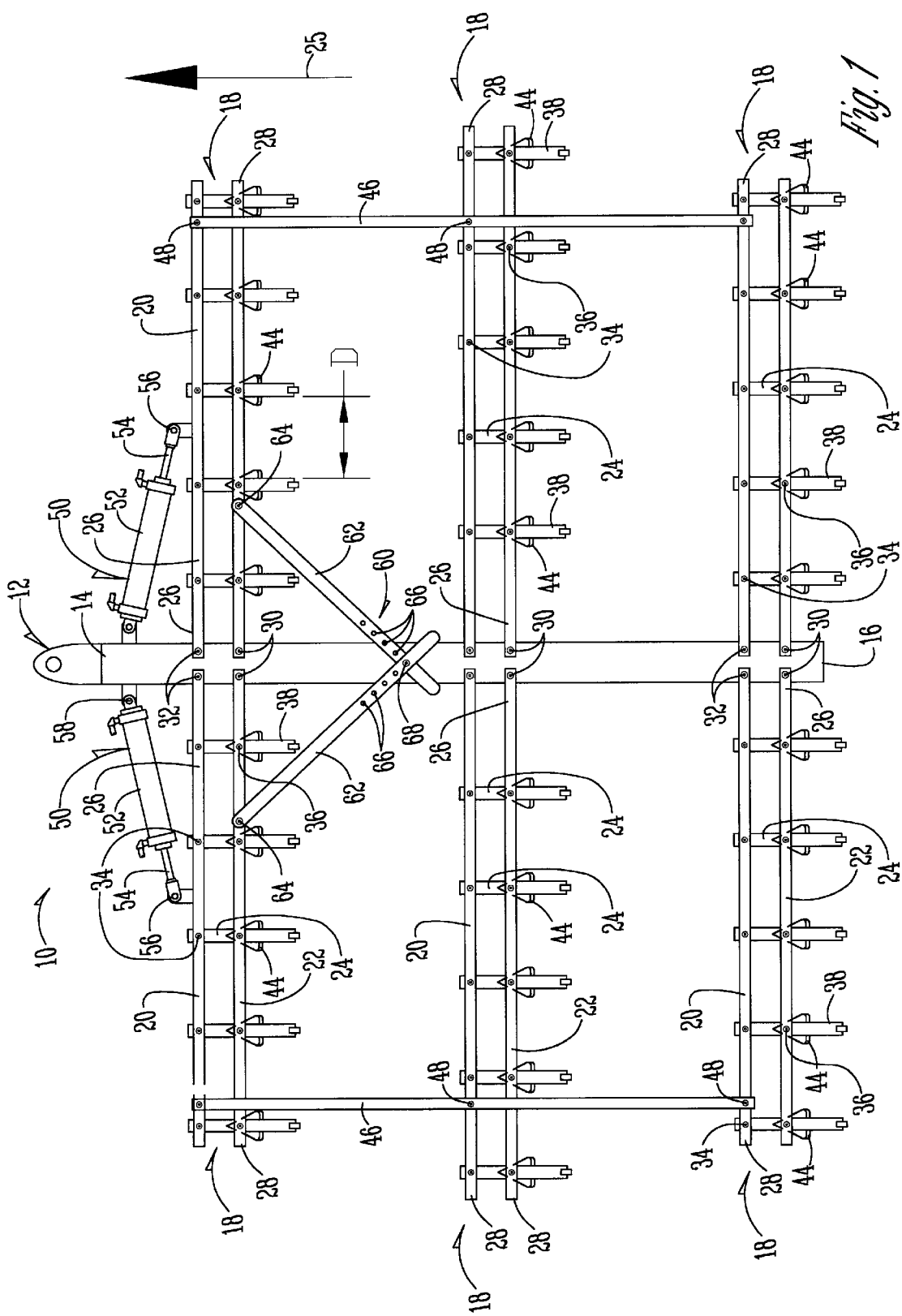
FIG. 1 is a top plan view of the variable width field implement, showing the wing assemblies in a first position.

Referring to the drawings, a variable width field implement is designated by the numeral 10. Field implement 10 is comprised of a central frame 12 and a wing assembly 18 or a series of assemblies 18. The central frame has both a front end 14 and a rear end 16.

The wing assembly 18 is comprised of a front link 20 and a back link 22. The wing assembly has an inner end 26 and an outer end 28. A plurality of cross links 24 are formed by pivotally connecting a plurality of ground cultivators 30 to the front link 20 and to the back link 22. Ground cultivators 30 are each pivotally connected to the front link 20 at 34 and to the back link 22 at 36. Pivotal connection 32 connects the front link 20 to the central frame 12 at the wing assembly's inner end 26. The back link 22 is connected to the central frame 12 at pivotal connection 30. Pivotal connections 30, 32, 34, and 36 define the four corners of a collapsible parallelogram. The sides of the parallelogram are formed from the central frame 12, the cross links 24, the front link 20, and the back link 22. Due to the pivotal connections, cross link 24 is always parallel to the central frame 12, and the front link 20 of the wing assembly 18 is always parallel to the back link 22.

Figure 2:
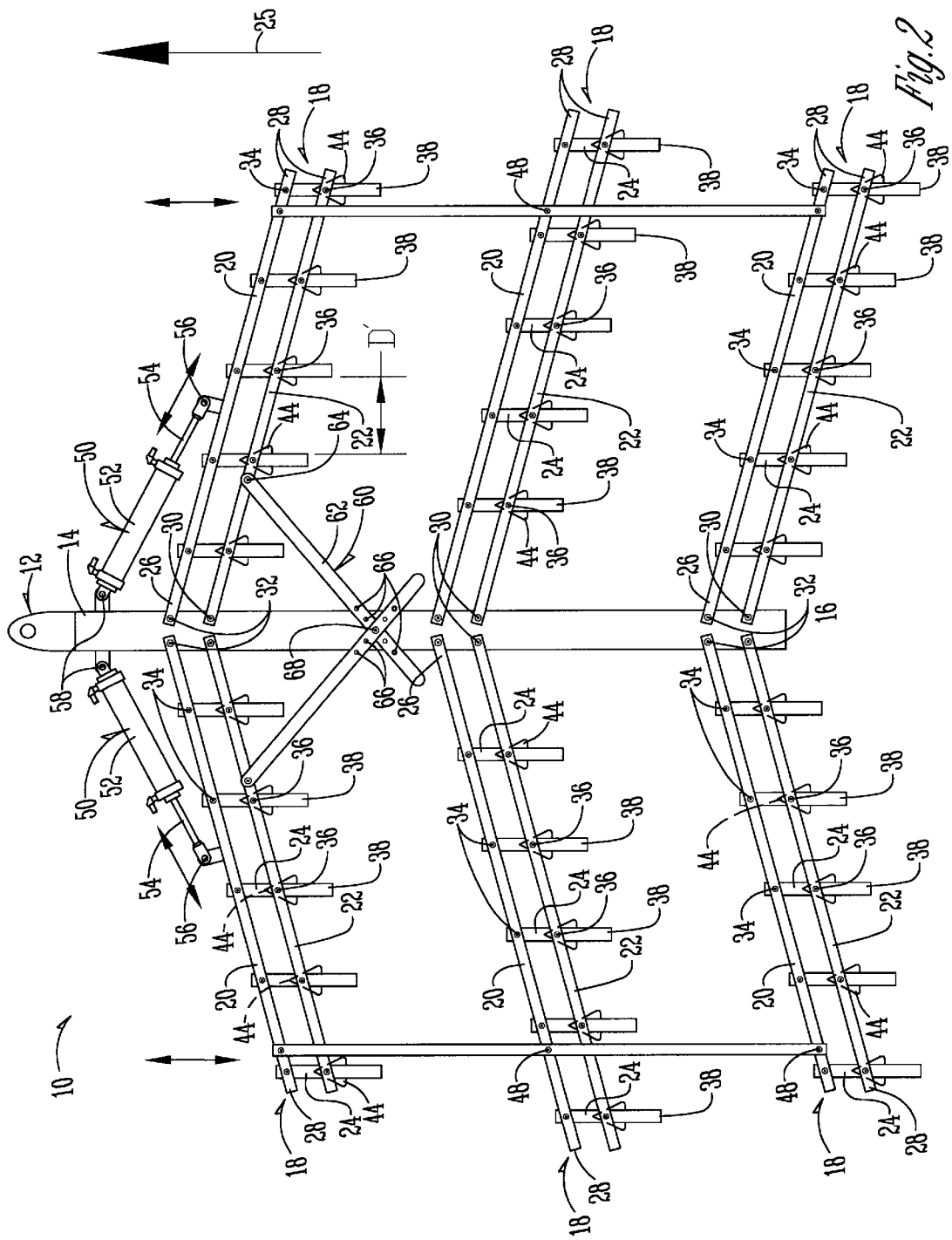
FIG. 2 is a top plan view of the variable width field implement, showing the wing assemblies in a second position swept back from their first position.
Figure 3:
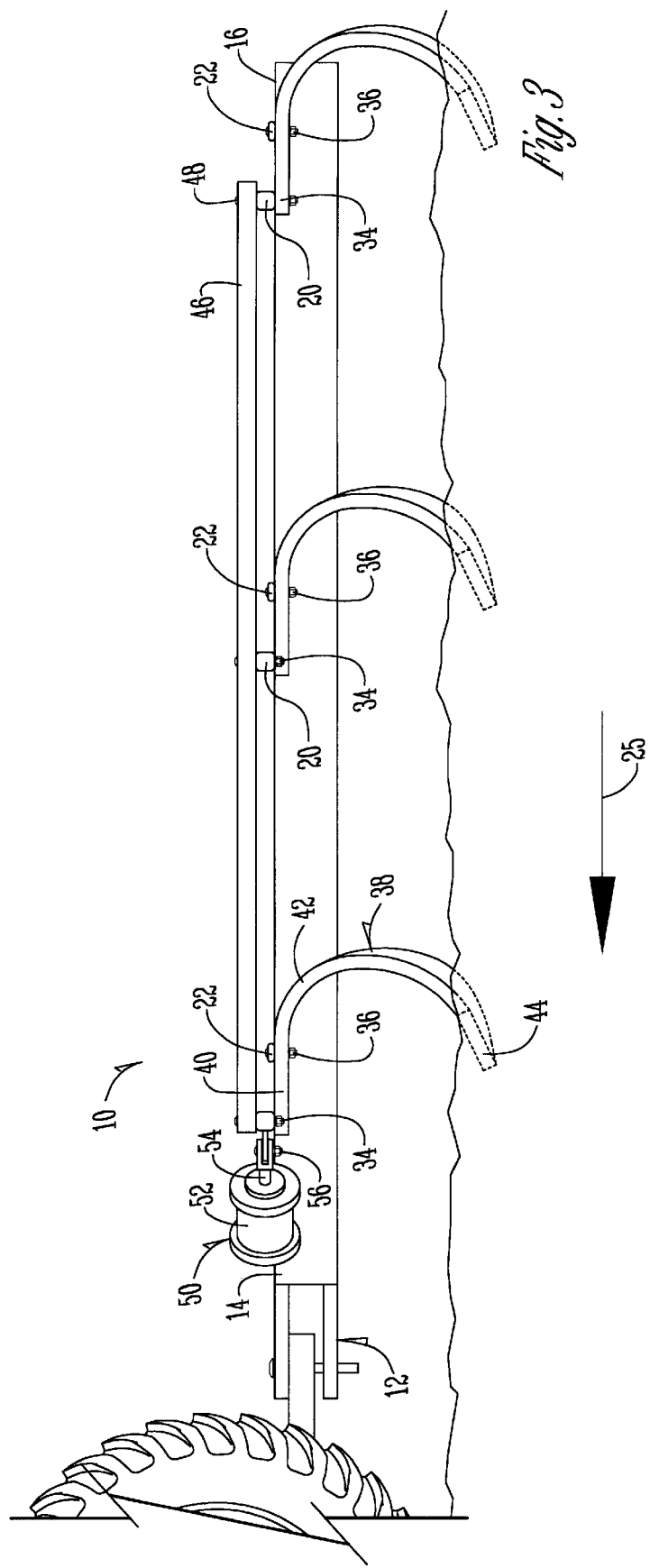
FIG. 3 is a left side elevational view of the implement of FIG. 1.

In FIGS. 1–3, the implement element is a ground cultivator 38. The ground cultivator has a horizontal shank 40 which forms the cross link 24, a curved shank 42, and a cultivating point 44.

The invention can be operated using one wing 18 or a series of wings 18. When a series of wings 18 is used, a longitudinal link 46 can be used on each side of frame 12 to connect the wing assemblies. A pivotal connection 48 attaches the longitudinal link 46 to the wings 18. The longitudinal link allows for coordinated movement of the set of wing assemblies on each side of frame 12.

The field implement can also include a power means. In the drawings, the power means is a hydraulic cylinder 50, which is attached to the central frame 12 and the first wing assembly 18. The hydraulic cylinder is comprised of a cylinder 52, and a rod 54. The hydraulic cylinder 50 is pivotally connected to the central frame 12 at 58. The rod 54 of the hydraulic cylinder 50 is connected to the wing assembly 18 at pivotal connection 56. In addition to a hydraulic cylinder, the power means could be manual operation, an electric motor, or any other equivalent source. The power means is useful for rotating the wing assemblies.

A lock 60 can be used to lock the wing assemblies 18 in place. The lock 60 consists of a link arm 62 which is pivotally connected to the wing assembly 18 at 64. The link arm has a series of holes 66 in it. The link arm 64 is secured to the central frame 12 by inserting a bolt 68 through one of the holes 66. The pivotal connection between the link arm and wing assembly allows the lock to be used for a plurality of wing positions. The lock ensures that the wings do not rotate when the lock is engaged, thus providing more consistent row widths.

In FIG. 1, the path distance between the implement elements is defined by D. In FIG. 2, the path distance is defined by D'. When the field implement is operated in the manner show in FIG. 2, the path distance D' is less than the path distance D shown in FIG. 1.

Figure 4:
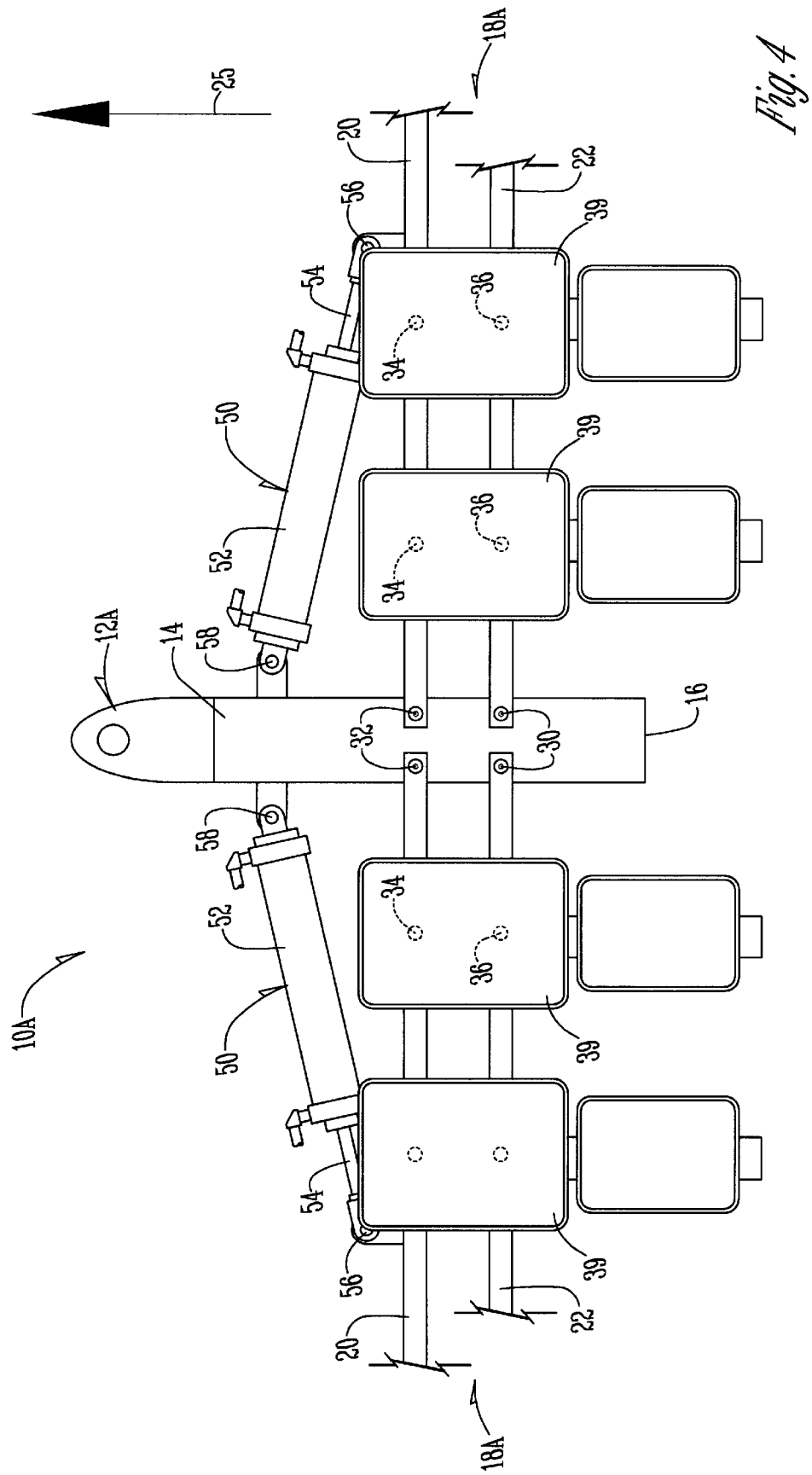
FIG. 4 is a top plan view of a modified form of the invention where the implement elements are planters.

An alternative embodiment is shown in FIG. 4. In that arrangement, the variable width field implement 10A is comprised of a central frame 12A and wing assemblies 18A. The implement element is a planter 39. The planter 39 is pivotally connected to the front link 20 at 34 and the back link 22 at 36 in the same manner as the ground cultivator. The front link 20 and the back link 22 are pivotally connected to the central frame 12A at 32 and 30, respectively. The element axis of the planter 39 remains parallel to the travel direction 25 utilizing the collapsible parallelogram geometry and the pivotal connections.

The main advantages of the invention are its ability to always have the implement elements parallel to the direction of travel 25, and its capacity to vary the distance between rows. These advantages are achieved through the parallelogram geometry of the linkage mechanism, and the pivotal connections between the wings and the frame, and between the wings and the implement elements. These advantages allow for use on rows of varying widths, and allow for quick and efficient changing of the path distance when necessary.

In the drawings and specification there has been set forth a preferred embodiment of the invention, and although specific terms are employed, these are used in a generic and descriptive sense only and not for purposes of limitation. Changes in the form and proportion of parts as well as in the substitution of equivalents are contemplated as circumstances may suggest or render expedient without departing from the spirit or scope of the invention as further defined in the following claims.

I claim:

1. A variable width field implement adapted to be moved in a direction of travel across an agricultural field comprising:
   an elongated frame having a forward end and a rearward end and a longitudinal axis extending in said direction of travel;
   two or more first wing assemblies, each having an inner end pivotally connected to said frame and an outer end extending laterally outwardly from said frame in a first direction;
   two or more second wing assemblies, each having an inner end pivotally connected to said frame and an outer end extending laterally outwardly from said frame in a second direction opposite from said first direction;
   a plurality of implement elements mounted to said first and second wing assemblies along the lengths thereof in spaced relationship to one another, each of said implement elements having an element axis oriented parallel to said direction of travel;
   each of said first and second wing assemblies being pivotal about said pivotal connection to said frame to move said outer end from a first wing position wherein said implement elements follow paths spaced a first distance apart to a second wing position wherein said implement elements follow paths spaced a second distance apart which is less than said first distance;
   said first and second wing assemblies each comprising a linkage mechanism pivotally connected to said implement elements and maintaining said element axes of said implement elements substantially parallel to said direction of travel throughout pivotal movement of said first and second wing assemblies between said first and second positions;
   a first longitudinal link pivotally connected to all of said first wing assemblies; and
   a second longitudinal link pivotally connected to all of said second wing assemblies.

2. A variable width field implement adapted to be moved in a direction of travel across an agricultural field comprising:
   an elongated frame having a forward end and a rearward end and a longitudinal axis extending in said direction of travel;
   a first wing assembly having an inner end connected to said frame and having an outer end extending away from said frame;
   a second wing assembly having an inner end connected to said frame and having an outer end extending away from said frame;
   said outer ends of said first and second wing assemblies being on opposite sides of said frame;
   each of said first and second wing assemblies comprising a first link having an inner end pivotally connected to said frame for pivotal movement about a vertical first link axis, and a second link having an inner end pivotally connected to said frame for pivotal movement about a vertical second link axis;
   a plurality of implement elements mounted to said first and second wing assemblies in spaced relation to one another, each of said implement elements being pivotally connected about a forward axis to said first link and pivotally connected about a rear axis to said second link;
   said first and second wing assemblies being pivotal about said first and second link axes from a forward position to a swept back position whereby said forward axis and said rear axis of each of said implement elements lie on an implement line which is substantially parallel to said direction of travel throughout movement of said first and second wing assemblies between said forward and swept back positions, and the distances between said implement lines of each of said implement elements are reduced as said first and second wing assemblies move from said forward to said swept back positions.

3. The variable width field element of claim 2 wherein said implement elements each comprise a ground cultivator.

4. The variable width field element of claim 3 and further comprising a lock mechanism detachably engaging said frame and said first and second wing assemblies for selectively holding said first and second wing assemblies against pivotal movement about said first and second link axes.

5. The variable width field element of claim 2 wherein said implement elements each comprise a planter.

6. The variable width field element of claim 2 and further comprising power means connected to said frame and said first and second wing assemblies for moving said first and second wing assemblies between said forward and swept back positions.

7. A variable width field implement adapted to be moved in a direction of travel across an agricultural field comprising:

an implement frame;

a first wing assembly comprising elongated first and second links each having first and second ends, said first ends of said first and second links being pivotally mounted to said frame for pivotal movement about vertical spaced apart first and second link axes, respectively;

two or more implement elements, each of which is pivotally mounted to said first link for pivotal movement about a vertical first element axis and is pivotally mounted to said second link for pivotal movement about a second element axis, said first and second element axes of each of said implement elements defining an implement line;

said first wing assembly being pivotal about said first and second link axes from a forward position wherein said implement lines of said two or more implement elements are spaced apart a first distance and are substantially parallel to said direction of travel to a swept back position wherein said implement lines of said two or more implement elements are spaced apart a second distance less than said first distance and are substantially parallel to said direction of travel.

8. The variable width field implement according to claim 7 and further comprising a second wing assembly the same as said first wing assembly and having a plurality of said implement elements mounted along the length thereof in spaced relation to one another, said first wing assembly extending a first direction away from said frame member and said second wing assembly extending in a second opposite direction away from said frame member.

9. The variable width field implement according to claim 8 and further comprising a plurality of said first wing assemblies and a plurality of said second wing assemblies, each pivotally connected to said frame, said first wing assemblies extending outwardly from said frame in said first direction and said second wing assemblies extending outwardly from said frame in said second direction.

10. The variable width field implement according to claim 9 wherein said implement elements are ground engaging cultivators.

11. The variable width field implement according to claim 8 wherein a first longitudinal link is pivotally connected to all of said first wing assemblies and a second longitudinal link is pivotally connected to all of said second wing assemblies.

12. The variable width field implement according to claim 11 and further comprising power means connected to said first and second wing assemblies for moving said first and second wing assemblies between said foward and swept back positions.

13. The variable width field implement according to claim 12 wherein said power means comprise a first hydraulic cylinder and a second hydraulic cylinder connected to said first and second wing assemblies respectively.

14. The variable width field implement according to claim 11 and further comprising a lock for selectively locking said first and second wing assemblies against pivotal movement with respect to said frame.

15. The variable width field implement according to claim 7 wherein said implement elements are planters.

* * * * *